T. LOUGHRAN.
Crockery-Pitcher.
No. 203,472. Patented May 7, 1878.
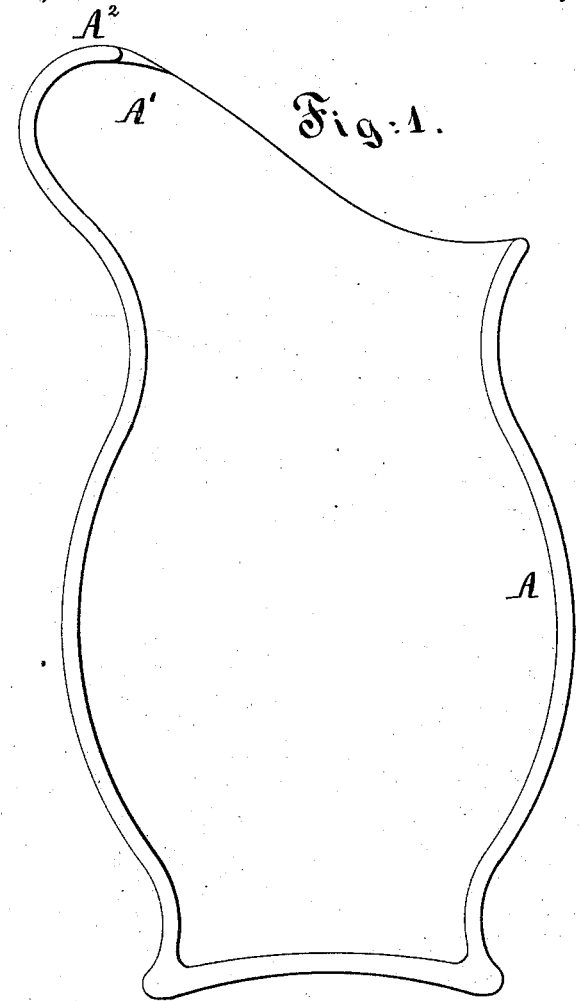
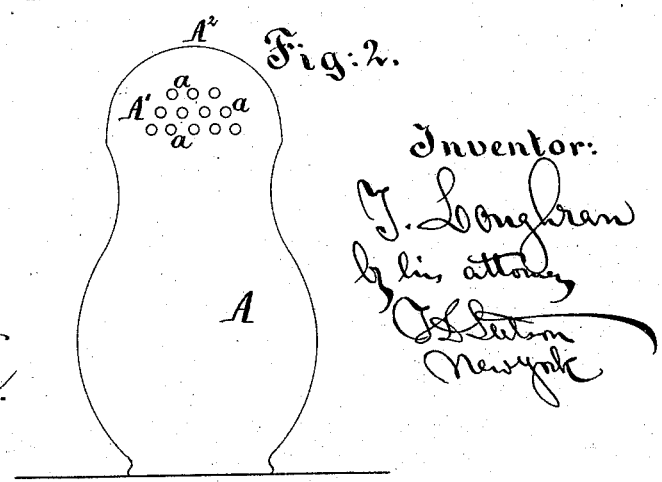

UNITED STATES PATENT OFFICE.

THOMAS LOUGHRAN, OF NEW YORK, N. Y.

IMPROVEMENT IN CROCKERY PITCHERS.

Specification forming part of Letters Patent No. 203,472, dated May 7, 1878; application filed October 23, 1877.

*To all whom it may concern:*

Be it known that I, THOMAS LOUGHRAN, a practical potter, of New York city, in the county and State of New York, have invented certain new and useful Improvements relating to Crockery Pitchers, of which the following is a specification:

I have devised a crockery vessel in one piece, which can be easily and cheaply made, may be reached at every point for cleaning by the hand in the ordinary manner, is capable of serving all ordinary uses of a pitcher, and which, furthermore, serves as a strainer to arrest lemon-seeds or any other solid matter, and allow to flow the water alone, or only such small substances as will go through small perforations.

I find that by extending upward the nose or snip of an otherwise ordinary crockery pitcher, and curving it inward toward the center line of the pitcher, and perforating it, I can produce a perforated " dam" as a part of the pitcher, and thereby obtain at the same time and by the same structure a pitcher with sufficiently free delivery and an efficient strainer.

Pitchers have been before made with removable strainers; but such are objectionable for obvious reasons, one of which is the liability of the strainer to be displaced when the pitcher is reversed, and to be broken or lost. Crockery vessels, as tea-pots and coffee-pots, having deep spouts outside or inside, have been made with permanent strainers; but such cannot be wiped by the hands, because the interior of the spout is obviously inaccessible.

My strainer-pitcher has all the qualities of an ordinary pitcher, without any inaccessible point.

The accompanying drawings form a part of this specification.

Figure 1 represents one of the halves as it comes from the mold, and Fig. 2 a front view of the complete pitcher on a smaller scale.

Similar letters of reference indicate like parts in both figures.

I produce, by pressing in suitable molds by the ordinary and well-known processes, two halves of my pitcher, one of which is shown in Fig. 1, and the other is a counterpart thereto. The part A corresponds to the ordinary pitcher. The parts $A^1$ $A^2$ are extensions upward and inward, the part $A^1$ being a slightly-curved extension upward, and the part $A^2$ being an extension inward, the whole being of a smoothly-curved contour, and giving as graceful and tasty an effect as the object will allow. The two halves being wetted at the edges and made to strongly adhere, and the joint being properly smoothed, I perforate the part $A^1$ sufficiently with holes $a$ of uniform size, and then glaze and burn.

The internal lip or inwardly-curved part $A^2$ should be drawn inward as far as the mold can be successfully and conveniently worked. I have shown what I esteem about the proper extent. It forms a sufficient dam, while allowing the hand ready access to the interior in the forming and in all subsequent cleaning processes.

The handle is applied in the ordinary manner, and any decoration desired may be made on the pitcher, the same as on ordinary crockery vessels.

Every part of a pitcher should be accessible, in order to allow it to be wiped dry, because if left wet the surface is apt to croze. The majority of pitchers are in queensware, sometimes known as "ironstone china," and should be made in as few parts as possible for the foregoing reasons.

Pitchers have been before made each with a bar across the top; but such are objectionable, because the bar across the top interferes with the free access to the interior of the pitcher; and, besides, the bar has to be made separately, and then joined to the top of the pitcher, which makes it liable to open or crack, as the queensware body is of such peculiar nature that when ware is made separately and then joined together the parts joined are very apt to, and do, crack.

The part $A^2$ may be variously modified in form; but it should always be drawn inward sufficiently to produce a dam, and at the same time allow the mold to be successfully and conveniently worked, in order that each half of the perforated dam and pitcher can be made in one piece.

I propose that this pitcher shall be known by the name of "Utility Pitcher," as a convenient designation.

I claim as my invention—

1. The extended inwardly-curved nose molded in one with the body of the pitcher, giving freedom for contraction and allowing free access for working, cleansing, and wiping.

2. The crockery vessel A A$^1$ A$^2$, having the perforations $a$, and adapted to serve as and for the purposes herein specified.

In testimony whereof I have hereunto set my name in presence of two subscribing witnesses.

THOMAS LOUGHRAN.

Witnesses:
W. F. STETSON,
CHAS. C. STETSON.